US008836791B2

(12) United States Patent
Hirano

(10) Patent No.: US 8,836,791 B2
(45) Date of Patent: Sep. 16, 2014

(54) INFORMATION PROCESSING DEVICE, INFORMATION PROCESSING METHOD, PROGRAM FOR INFORMATION PROCESSING DEVICE, AND RECORDING MEDIUM

(75) Inventor: Hiromi Hirano, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/816,886

(22) PCT Filed: Mar. 6, 2012

(86) PCT No.: PCT/JP2012/055681
§ 371 (c)(1),
(2), (4) Date: Feb. 13, 2013

(87) PCT Pub. No.: WO2013/046749
PCT Pub. Date: Apr. 4, 2013

(65) Prior Publication Data
US 2013/0235208 A1   Sep. 12, 2013

(30) Foreign Application Priority Data

Sep. 29, 2011   (JP) .................................. 2011-215415

(51) Int. Cl.
*H04N 7/18*      (2006.01)
*G06K 9/00*      (2006.01)
*G06K 9/68*      (2006.01)
*G06T 7/20*      (2006.01)

(52) U.S. Cl.
CPC ......... *G06T 7/20* (2013.01); *G06T 2207/30196* (2013.01); *G06T 2207/30221* (2013.01); *G06T 2207/20148* (2013.01); *G06T 2207/10024* (2013.01); *G06T 2207/10016* (2013.01); *G06T 7/208* (2013.01); *G06T 2207/20144* (2013.01); *G06T 2207/20224* (2013.01); *G06T 2207/20076* (2013.01)
USPC ............................ 348/157; 382/103; 382/220

(58) Field of Classification Search
USPC .......................................................... 348/157
See application file for complete search history.

(56) References Cited

U.S. PATENT DOCUMENTS 7,536,029 B2 *   5/2009   Choi et al. .................... 382/103
8,160,370 B2 *   4/2012   Liu et al. ....................... 382/220
2010/0150401 A1   6/2010   Kizuki et al.

FOREIGN PATENT DOCUMENTS

EP       2 320 379 A1    5/2011
JP       2007-233798 A   9/2007

(Continued)

OTHER PUBLICATIONS

Hsung-Yi Ma, "Object Detection and Tracking for a Moving Surveillance Camera by Using Dynamic Backgroung Compensation", master's thesis, Jul. 2007, pp. 6, 12-35.
Jun-Liang Lai, "A Study on Visual Detection and Tracking of Moving Targets", master's thesis, Jul. 2006, 2 pages.

(Continued)

*Primary Examiner* — Hee-Yong Kim
(74) *Attorney, Agent, or Firm* — Sughrue Mion, PLLC

(57) ABSTRACT

Provided are devices, methods and recording mediums for processing video data including setting at least one particle on a target in an image of a previously-selected frame in a video, sequentially acquiring temporally-previous frames and temporally-next frames in the video after the previously-selected frame, determining a part whose difference in pixel values between the image of the acquired previous frame and the image of the next frame is a threshold or more and which corresponds to the target in the image of the previous frame as an outer edge of a particle tracking range, and setting the particles in the image of the next frame at positions of pixels which are within the outer edge of the tracking range, and specifying a position of the target in the image of the next frame based on the positions of the set particles.

6 Claims, 14 Drawing Sheets

(56) References Cited

FOREIGN PATENT DOCUMENTS

| | | |
|---|---|---|
| JP | 2007-249885 A | 9/2007 |
| JP | 2010-061478 A | 3/2010 |
| JP | 2010-147560 A | 7/2010 |
| JP | 2010-152557 A | 7/2010 |
| JP | 2011-107839 A | 6/2011 |
| JP | 4922472 B1 | 4/2012 |

OTHER PUBLICATIONS

Chueh-Wei Chang, "A Scene Parsing and Classification Method for Baseball Videos", Dec. 12, 2006, pp. 75-90.
Martijn Liem, et al., A Hybrid Algorithm for Tracking and Following People using a Robotic Dog; Human-Robot Interaction (HRI), 2008 3rd ACM/IEEE International Conference; pp. 185-192, Publisher: IEEE; Amsterdam, The Netherlands; Date Mar. 12-15, 2008.

* cited by examiner

INFORMATION PROCESSING DEVICE, INFORMATION PROCESSING METHOD, PROGRAM FOR INFORMATION PROCESSING DEVICE, AND RECORDING MEDIUM

CROSS REFERENCE TO RELATED APPLICATIONS

This application is a National Stage of International Application No. PCT/JP2012/055681 filed Mar. 6, 2012, claiming priority based on Japanese Patent Application No. 2011-215415 filed Sep. 29, 2011, the contents of all of which are incorporated herein by reference in their entirety.

TECHNICAL FIELD

The present invention relates to a technical field of an information processing device that performs information processings on video data, an information processing method, a program for the information processing device, and a recording medium.

BACKGROUND ART

Conventionally, there is known a particle filter as a method that tracks a specific target in a video. For example, Patent Document 1 discloses therein an image processing device that reads video data for each frame, generates edge images of image frames, distributes particles in a space of a set of coefficients and a space of shape space vectors, acquires a likelihood observation and a probability density distribution of each particle, and generates, as a track result, a curve which is obtained by performing weighted averaging on each parameter by the probability density distribution.

CITATION LIST

Patent Document

Patent Document 1: Japanese Patent Application Laid-Open No. 2010-152557

SUMMARY OF THE INVENTION

Problem to be Solved by the Invention

However, with the particle filter, when a color of a target is closer to its surrounding color in a frame, a border therebetween is difficult to specify in the frame. In such a case, particles may spread and scatter in a region which should be fundamentally out of the border of the target. Thus, there has been a problem that the target cannot be tracked.

The present invention has been made in terms of the problem, and an exemplary object thereof is to provide an information processing device or the like capable of accurately tracking a target.

Means for Solving the Problem

In order to solve the above problem, the invention according to a first aspect is characterized by including a particle initial setting means that sets at least one particle on the target in an image of a previously-selected frame in the video, a frame acquiring means that sequentially acquires temporally-previous frames and temporally-next frames in the video after the previously-selected frame, a tracking range's outer edge determining means that determines, as an outer edge of a particle tracking range, a part corresponding to the target in an image of the previous frame where a degree of difference in pixel values between the image of the previous frame and an image of the next frame acquired by the frame acquiring means is a threshold or more, a particle setting means that sets particles in the image of the next frame at positions of pixels which are within a predetermined range with reference to positions of particles in the image of the previous frame and within an outer edge determined by the tracking range's outer edge determining means and which have color information similar to color information on pixels at the positions of the reference particles, and a target specifying means that specifies a position of the target in the image of the next frame from the positions of the particles set by the particle setting means.

In the information processing device according to the first aspect, the invention according to a second aspect is characterized in that the particle initial setting means sets the particles at a plurality of parts of the target, a hue angle calculating means that calculates a hue of a pixel where the particle at each part of the target is positioned and calculates a hue angle between the parts is further provided, and the target specifying means specifies a position of the target further based on the hue angle between the parts calculated by the hue angle calculating means.

In the information processing device according to the first aspect or the second aspect, the invention according to a third aspect further includes a track determining means that determines whether the target can be tracked based on the particles set by the particle setting means, and a particle resetting means that, when the track determining means determines that tracking is impossible, resets particles in the image of the next frame according to the positions of the particles set by the particle initial setting means or the particle setting means.

In the information processing device according to any one of the first aspect to the third aspect, the invention according to a fourth aspect further includes a storing means that stores the positions of the particles set by the particle initial setting means or the particle setting means, wherein when the tracking range's outer edge determining means cannot determine an outer edge of the tracking range, the particle setting means sets particles in the image of the next frame according to the positions of the particles in the previous frame for which the outer edge of the tracking range cannot be determined with reference to the storing means.

The invention according to a fifth aspect is characterized by including a particle initial setting step of setting at least one particle on the target in an image of a previously-selected frame in the video, a frame acquiring step of sequentially acquiring temporally-previous frames and temporally-next frames in the video after the previously-selected frame, a tracking range's outer edge determining step of determining, as an outer edge of a particle tracking range, a part corresponding to the target in an image of the previous frame where a degree of difference in pixel values between the image of the previous frame and an image of the next frame acquired by the frame acquiring means is a threshold or more, a particle setting step of setting particles in the image of the next frame at positions of pixels which are within a predetermined range with reference to positions of particles in the image of the previous frame and within an outer edge determined by the tracking range's outer edge determining means and which have color information similar to color information on pixels at the positions of the reference particles, and a target specifying step of specifying a position of the target in the image of the next frame from the positions of the particles set by the particle setting means.

The invention according to a sixth aspect causes a computer to function as a particle initial setting means that sets at least one particle on the target in an image of a previously-selected frame in the video, a frame acquiring means that sequentially acquires temporally-previous frames and temporally-next frames in the video after the previously-selected frame, a tracking range's outer edge determining means that determines, as an outer edge of a particle tracking range, a part corresponding to the target in an image of the previous frame where a degree of difference in pixel values between the image of the previous frame and an image of the next frame acquired by the frame acquiring means is a threshold or more, a particle setting means that sets particles in the image of the next frame at positions of pixels which are within a predetermined range with reference to positions of particles in the image of the previous frame and within an outer edge determined by the tracking range's outer edge determining means and which have color information similar to color information on pixels at the positions of the reference particles, and a target specifying means that specifies a position of the target in the image of the next frame from the positions of the particles set by the particle setting means.

The invention according to a seventh aspect records a program for an information processing device in a computer readable manner, the program causing a computer to function as a particle initial setting means that sets at least one particle on the target in an image of a previously-selected frame in the video, a frame acquiring means that sequentially acquires temporally-previous frames and temporally-next frames in the video after the previously-selected frame, a tracking range's outer edge determining means that determines, as an outer edge of a particle tracking range, a part corresponding to the target in an image of the previous frame where a degree of difference in pixel values between the image of the previous frame and an image of the next frame acquired by the frame acquiring means is a threshold or more, a particle setting means that sets particles in the image of the next frame at positions of pixels which are within a predetermined range with reference to positions of particles in the image of the previous frame and within an outer edge determined by the tracking range's outer edge determining means and which have color information similar to color information on pixels at the positions of the reference particles, and a target specifying means that specifies a position of the target in the image of the next frame from the positions of the particles set by the particle setting means.

Effect of the Invention

According to the present invention, at least one particle is set on a target in an image of a previously-selected frame of a video, temporally-previous frames and temporally-next frames are sequentially acquired in the video after the previously-selected frame, a part corresponding to the target in an image of the previous frame, where a degree of difference in pixel values between the image of the temporally-previous frame and an image of the temporally-next frame is a threshold or more, is determined as an outer edge of a particle tracking range, particles in the image of the next frame are set at positions of pixels which are within a predetermined range with reference to the particles in the image of the previous frame and within the outer edge of the tracking range and which have color information similar to color information of the pixels at the positions of the reference particles, and a position of the target in the image of the next frame is specified from the positions of the set particles so that the particles in the image of the next frame are set only within the outer edge of the tracking range corresponding to the target in the image of the previous frame, where the degree of difference in the pixel values between the image of the temporally-previous frame and the image of the temporally-next frame, thereby preventing the particles from scattering and accurately tracking the target.

MODES FOR CARRYING OUT THE INVENTION

An embodiment according to the present invention will be described below with reference to the drawings. In addition, the embodiment described below is an embodiment in which the present invention is applied to an information processing device.

[1. Structure and Functional Outline of Information Processing Device]

A structure and outline functions of an information processing device according to an embodiment of the present invention will be described first using FIG. 1.

Figure 1:
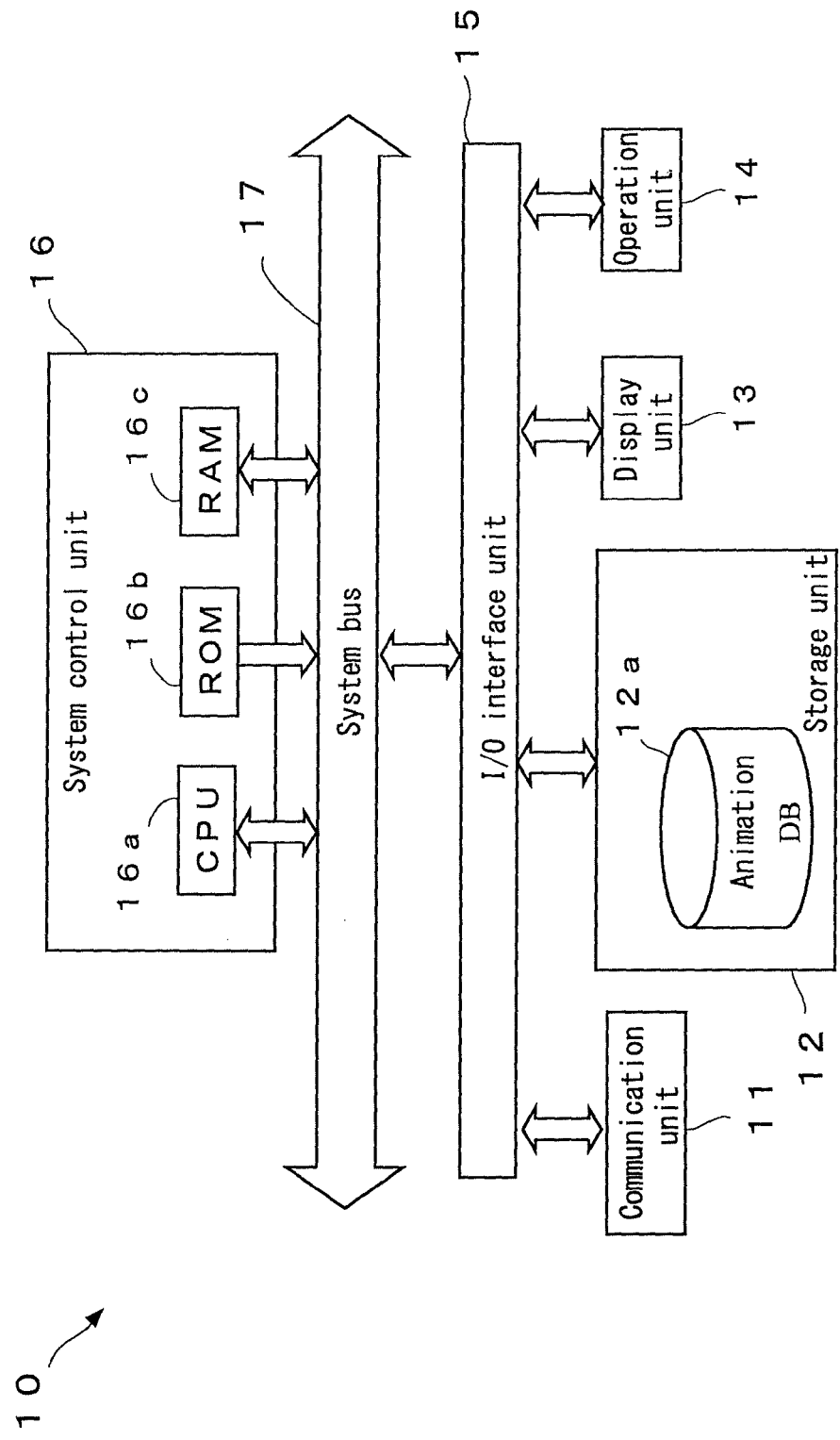
FIG. 1 is a block diagram illustrating an exemplary outline structure of an information processing device according to an embodiment of the present invention.

FIG. 1 is a schematic diagram illustrating an exemplary outline structure of the information processing device 10 according to the present embodiment.

As illustrated in FIG. 1, the information processing device 10 functioning as a computer includes a communication unit 11, a storage unit 12, a display unit 13, an operation unit 14, an I/O interface unit 15 and a system control unit 16. The system control unit 16 and the I/O interface unit 15 are connected to each other via a system bus 17.

The information processing device 10 performs information processings on video data. For example, the information processing device 10 receives image data of horse racing covered live on a horse racing site (not illustrated) or the like via a network (not illustrated), performs information processings on the received video data, and transmits the video data subjected to the information processings to a user terminal device (not illustrated). The information processing device 10 may display the video data subjected to the information processings on the display unit 13 as a user terminal device.

When the information processing device 10 is connected to a network or local area network, the communication unit 11 controls a communication state and exchanges data. In addition, the information processing device 10 receives video data of horse racing covered live on a horse racing site or the like via the communication unit 11.

The storage unit 12 as an exemplary storing means is configured of a hard disk drive, for example, and stores therein various programs such as operating system and server programs, video data, and the like. In addition, various programs may be acquired from other server device or the like via a network, or may be recorded in a recording medium and read via a drive device (not illustrated).

The storage unit 12 constructs therein an video database 12a (which will be denoted as "video DB 12a" below) that stores video data such as shot horse racing or temporarily stores video data of horse racing live coverage. The storage unit 12 stores therein files of Web pages described in a markup language such as HTML (HyperText Markup Language) or XML (Extensible Markup Language) in order to display information from a horse racing site on a terminal device or the display unit 13.

The display unit 13 is configured of a liquid crystal display device or EL (Electro Luminescence) device, for example. The display unit 13 displays thereon image data of horse racing or the like.

The operation unit 14 is configured of a keyboard or a mouse, for example. The user inputs a response through the operation unit 14. In addition, when the display unit 13 is a touch-switch type display panel such as touch panel, the operation unit 14 acquires position information of the display unit 13 which the user contacts or approaches.

Then, the I/O interface unit 15 performs interface processings between the communication unit 11, the storage unit 12 and the system control unit 16.

The system control unit 16 is configured of a CPU (Central Processing Unit) 16a, a ROM (Read Only Memory) 16b, a RAM (Random Access Memory) 16c (exemplary storing means) or the like. The CPU 16a reads and executes various programs stored in the ROM 16b or the storage unit 12 so that the system control unit 16 functions as a target specifying means that specifies a position of a target from positions of particles.

[2. Operations of Information Processing Device 10]
(2.1 Exemplary Operations of Information Processing Device 10)

Figure 2:
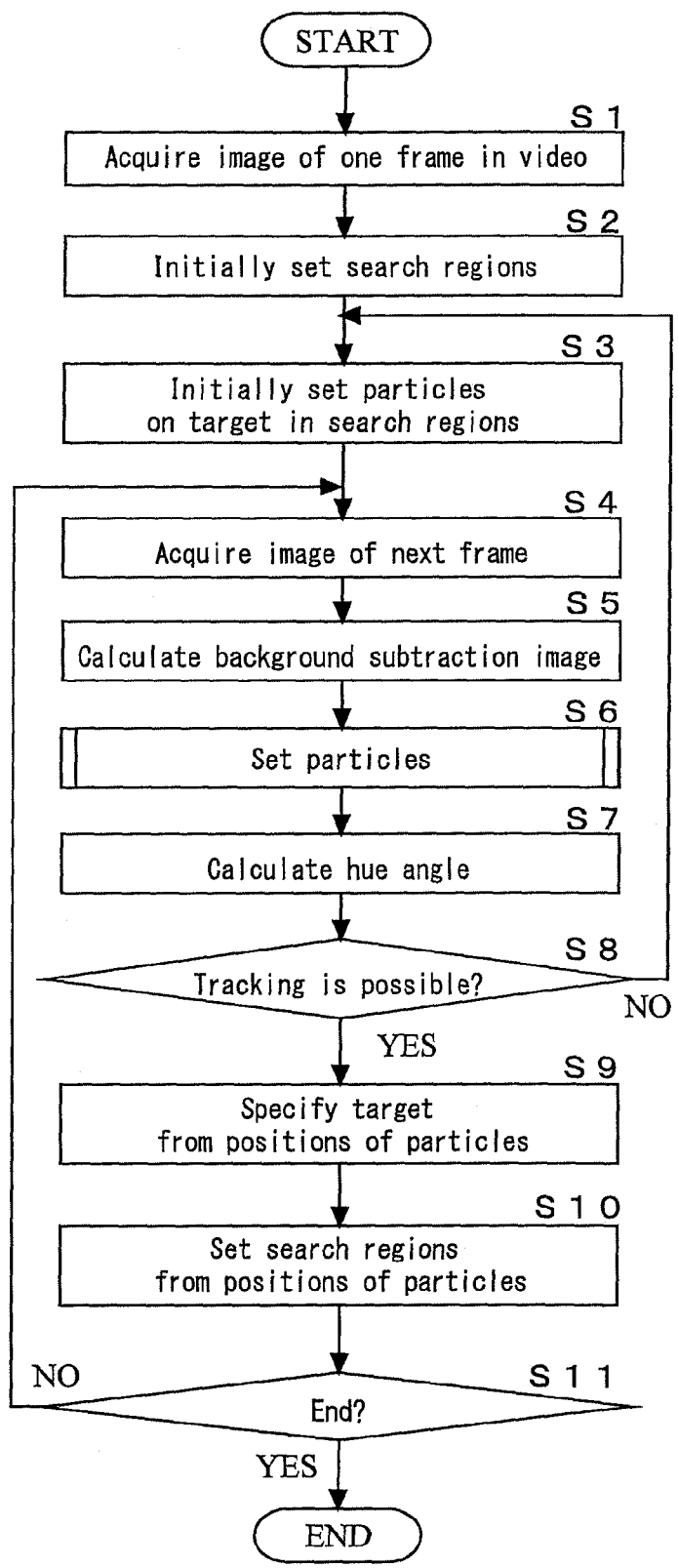
FIG. 2 is a flowchart illustrating exemplary operations of the information processing device of FIG. 1.
Figure 3:
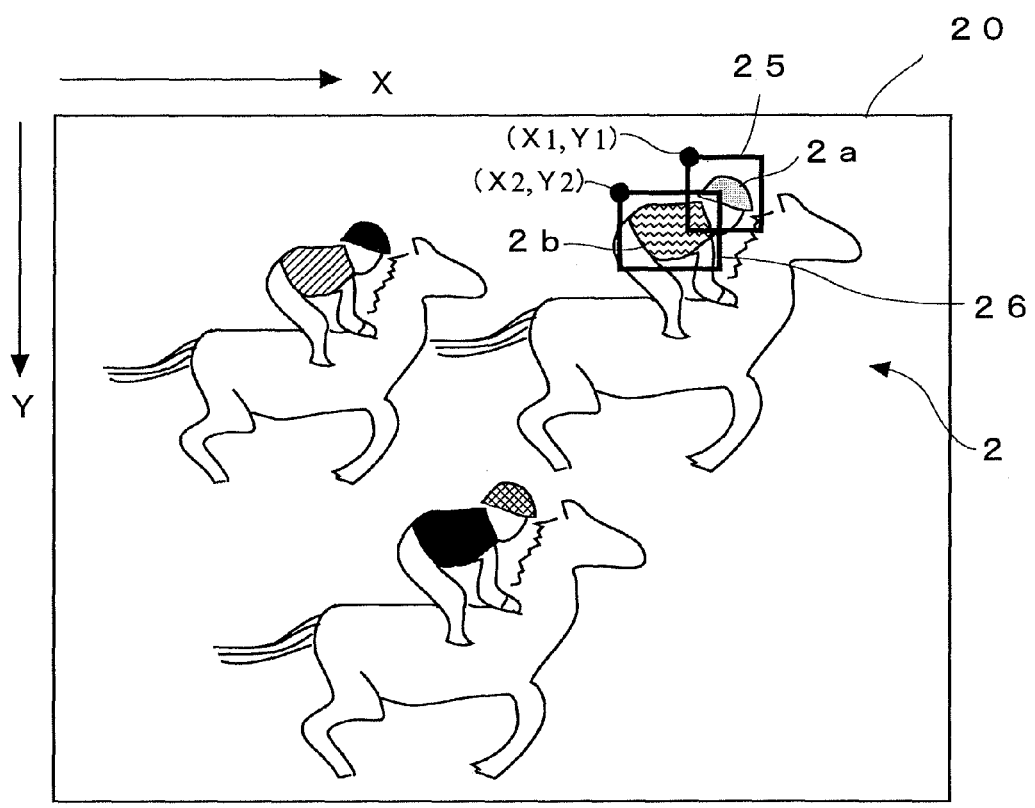
FIG. 3 is a schematic diagram illustrating an exemplary frame of a video processed by the information processing device of FIG. 1.
Figure 4:
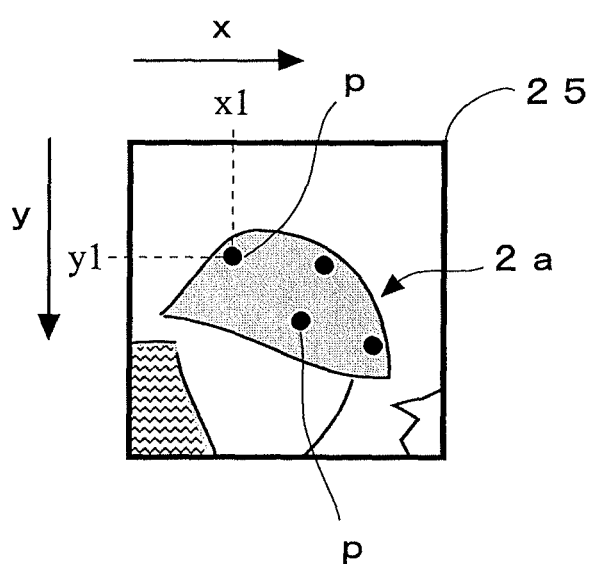
FIG. 4 is a schematic diagram illustrating exemplary setting of particles on a target in the frame of FIG. 3.
Figure 5:
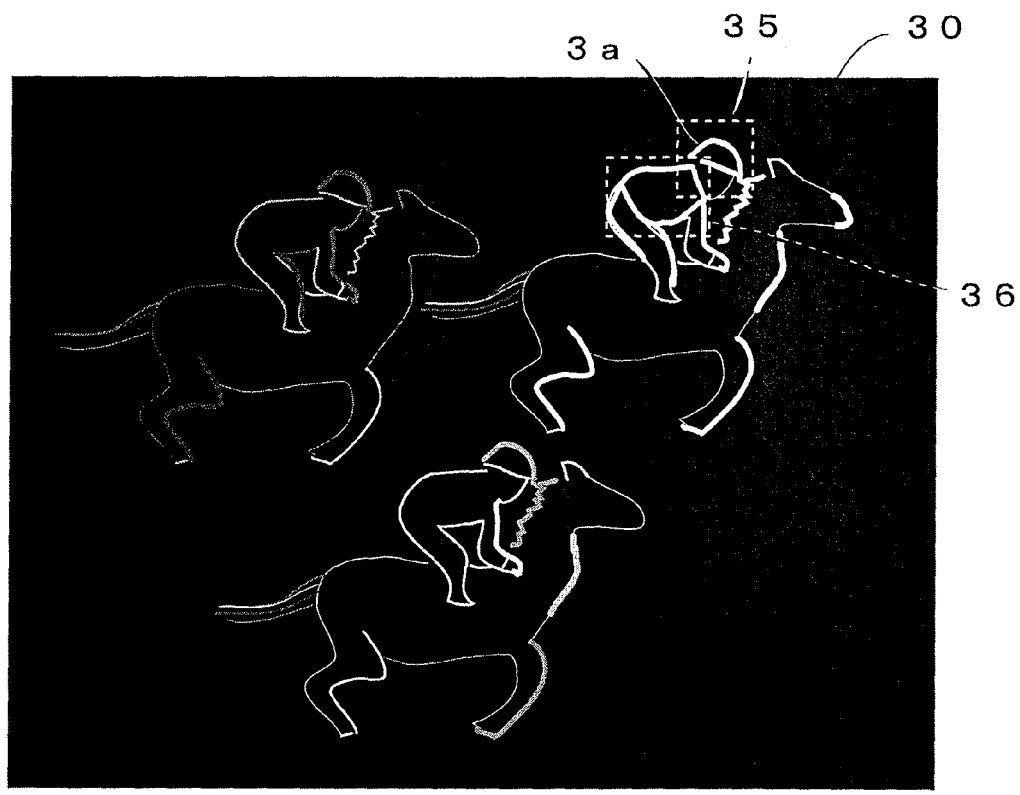
FIG. 5 is a schematic diagram illustrating an exemplary image depending on background subtraction for the frame of FIG. 3.
Figure 6:
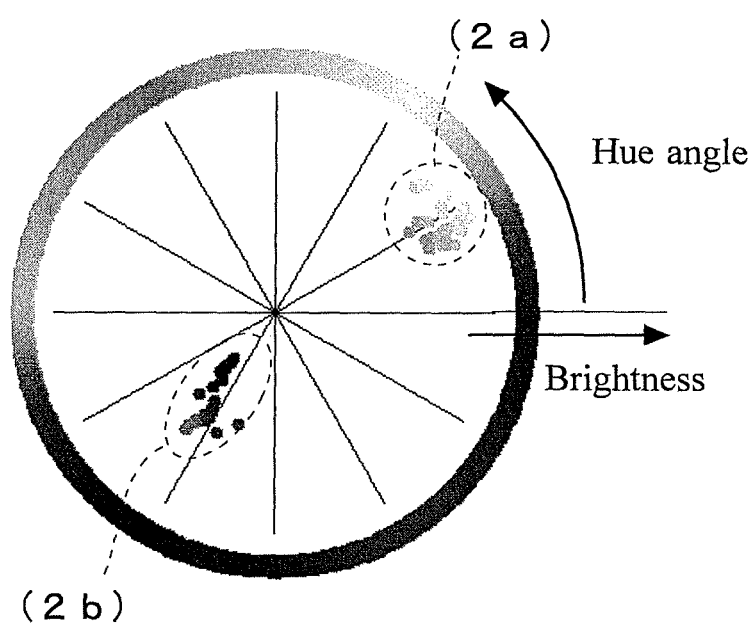
FIG. 6 is a schematic diagram illustrating an exemplary hue angle relative to particles on a target.
Figure 7:
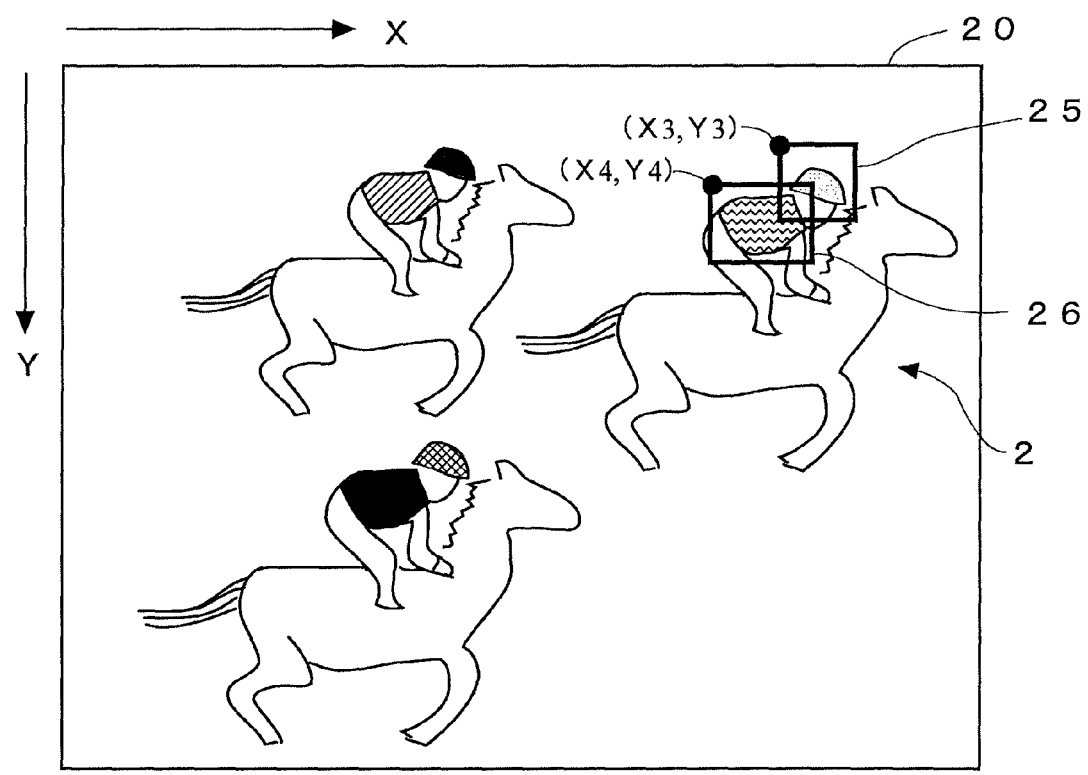
FIG. 7 is a schematic diagram illustrating exemplary tracking of a target in a frame of a video processed by the information processing device of FIG. 1.
Figure 8:
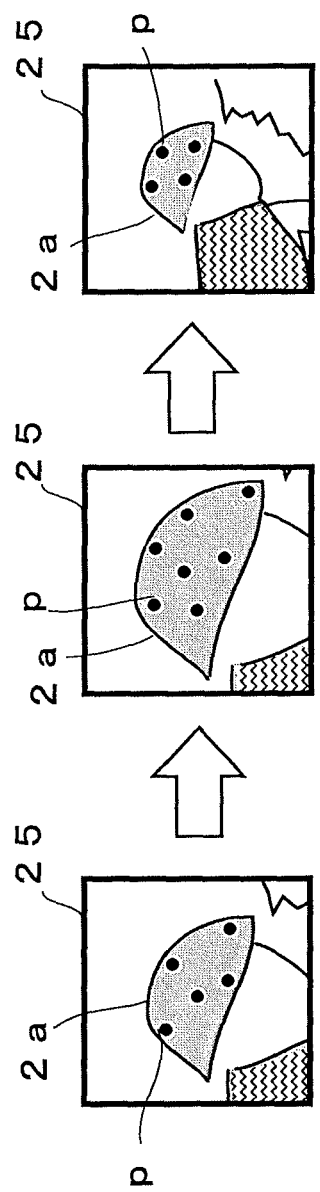
FIG. 8 is a schematic diagram illustrating exemplary increase/decrease in particles.

Exemplary operations of the information processing device 10 according to one embodiment of the present invention will be described below using FIGS. 2 to 8. FIG. 2 is a flowchart illustrating exemplary operations of the information processing device 10. FIG. 3 is a schematic diagram illustrating an exemplary frame of a video processed by the information processing device 10. FIG. 4 is a schematic diagram illustrating exemplary setting of particles on a target in a frame. FIG. 5 is a schematic diagram illustrating an exemplary image depending on background subtraction for the frame. FIG. 6 is a schematic diagram illustrating an exemplary hue angle relative to particles on a target. FIG. 7 is a schematic diagram illustrating exemplary tracking of a target in a frame of a video processed by the information processing device 10. FIG. 8 is a schematic diagram illustrating exemplary increase/decrease in particles.

As illustrated in FIG. 2, the information processing device 10 acquires an image of one frame of a video (step S1). Specifically, the system control unit 16 in the information processing device 10 reads video data from the video DB 12a, and acquires one frame of a video (an exemplary previously-selected frame of a video), and stores it in the RAM 16c or the like. For example, the system control unit 16 in the information processing device 10 acquires an image of one frame as illustrated in FIG. 3, and displays it on the display unit 13.

The information processing device 10 then initially sets search regions (step S2). Specifically, the system control unit 16 in the information processing device 10 sets a plurality of search regions from the acquired image of the frame. For example, as illustrated in FIG. 3, the user of the information processing device 10 sets a search region 25 and a search region 26 through the operation unit 14. In the case of horse racing, as illustrated in FIG. 3, a jockey riding on a horse wears a helmet (a helmet part 2a) and a racing uniform (a racing uniform part 2b). A combination of different colors for the helmet and the racing uniform enables each jockey to be easily identified. The target 2 including the jockey and the horse is set such that the search region 25 contains the helmet part 2a of the jockey and the search region 26 contains the racing uniform part 2b of the jockey. A coordinate (X1, Y1) where the search region 25 is positioned and a coordinate (X2, Y2) where the search region 26 is positioned are set for a frame 20. The system control unit 16 in the information processing device 10 stores position information on the set search regions 25, 26 or information on the sizes of the search regions 25, 26 in the RAM 16c or the like.

The information processing device 10 then initially sets particles on the target in the search regions (step S3). Specifically, the system control unit 16 in the information processing device 10 sets particles p at parts whose color is the closest to the color of the helmet or the racing uniform near the border of part of the target or in the region surrounded by the border for part of the target 2 (such as the helmet part 2a or the racing uniform part 2b) in the set search regions 25, 26. As illustrated in FIG. 4, a plurality of particles p are set on the target helmet part 2a in the search region 25. A coordinate (x1, y1) or the like in the search region is set for each particle p with reference to the search region. For example, the coordinate (x1, y1) in the search region 25 is set with the coordinate (X1, Y1) in the search region 25 as a reference (x=0, y=0). The system control unit 16 in the information processing device 10 stores position information or color information of the set particles p in the RAM 16c or the like. In addition, the particle p may be one pixel or multiple pixels in the image data of the frame.

In this way, the system control unit 16 in the information processing device 10 functions as an exemplary particle initial setting means that sets at least one particle on a target in an image of one previously-selected frame of the video. The system control unit 16 in the information processing device 10 functions as an exemplary particle initial setting means that sets particles on a plurality of parts in the target. The RAM 16c functions as an exemplary storing means that stores the positions of the particles set by the particle initial setting means or the particle setting means.

The information processing device 10 then acquires an image of a next frame (step S4). Specifically, the system control unit 16 in the information processing device 10 reads video data from the video DB 12a, acquires an image of a temporally-next frame in the video, and stores it in the RAM 16c or the like. In this way, the system control unit 16 in the information processing device 10 functions as an exemplary frame acquiring means that sequentially acquires temporally-previous frames and temporally-next frames in the video after one previously-selected frame.

The information processing device 10 then calculates an image depending on background subtraction (background subtraction image (step S5). Specifically, the system control unit 16 in the information processing device 10 subtracts an image of a temporally-previous frame (for example, an image of a temporally-one-previous frame) from an image of a next frame acquired in step S4 to find a degree of difference of the pixel values, and calculates the background subtraction image as a foreground if the degree of difference of the pixel values is a predetermined value or more and as a background when it is less than the predetermined value. In addition, when a horse running in a horse race is shot, a camera tracks and shoots the horse, but the background of the racetrack changes little and is easily specified as a background. On the other hand, since a running horse or a jockey moves up and down, a contour of the horse or the jockey is easily assumed as a foreground as illustrated in FIG. 5.

Herein, the background subtraction image is a subtraction image which is found by a method for removing a background and extracting a foreground, such as simple background subtraction or inter-frame subtraction.

In this way, the system control unit 16 in the information processing device 10 functions as an exemplary background subtraction image calculating means that calculates an image depending on background subtraction between an image of a previous frame and an image of a next frame acquired by the frame acquiring means. The system control unit 16 in the information processing device 10 functions as an exemplary background subtraction image calculating means that calculates a background subtraction image as a foreground when a degree of difference of the pixel values is a threshold or more.

The information processing device 10 then sets particles (step S6). The system control unit 16 in the information processing device 10 generates particles at positions of pixels which are within a predetermined range with reference to the positions of the particles in the previous frame and which have color information similar to the color information of the pixels at the reference particles, deletes particles outside an outer edge of the tracking range determined in accordance with the foreground of the background subtraction image (an outer edge of the tracking range where the particles are tracked), and thereby sets particles. The system control unit 16 in the information processing device 10 stores the position information or the color information on the set particles p in the RAM 16c or the like. In this way, the RAM 16c functions as an exemplary storing means that stores the positions of the particles set by the particle initial setting means or the particle setting means. In addition, the setting of particles will be described in detail in a sub-routine of the particle setting.

The information processing device 10 then calculates a hue angle (step S7). Specifically, the system control unit 16 in the information processing device 10 calculates a hue of each particle on the helmet part 2a and a hue of each particle on the racing uniform part 2b. As illustrated in FIG. 6, the system control unit 16 in the information processing device 10 finds an average value of the coordinate of each particle on the helmet part 2a and an average value of the coordinate of each particle on the racing uniform part 2b in a hue space. The system control unit 16 in the information processing device 10 then calculates a hue angle between the parts of a group of particles on the helmet part 2a and a group of particles on the racing uniform part 2b from the average value of the coordinate of each particle on the helmet part 2a and the average value of the coordinate of each particle on the racing uniform part 2b. In this way, the system control unit 16 in the information processing device 10 functions as an exemplary hue angle calculating means that calculate each hue of a pixel where the particle is positioned in each part of the target and calculates a hue angle between the parts.

In addition, also when the search regions are initially set in step S2 and the particles are initially set on the target in step S3, the system control unit 16 in the information processing device 10 calculates the hue angle and stores it as an initial hue angle in the RAM 16c or the like.

The information processing device 10 then determines whether a target can be tracked (step S8). Specifically, the system control unit 16 in the information processing device 10 determines that the target cannot be tracked when a hue angle between the parts in a temporally-next image calculated in step S8 is different from an initial hue angle by more than a predetermined value. Even when all the particles disappear, the system control unit 16 in the information processing device 10 determines that the target cannot be tracked.

In addition, also when the target is hidden due to occlusion and an outer edge of the tracking range cannot be determined for more than a predetermined number of consecutive frames, the system control unit 16 in the information processing device 10 may determine that the target cannot be tracked. On the other hand, when the target is temporarily hidden or the foreground of the background subtraction image is temporarily unclear due to a slight motion or looking of the target and thus an outer edge of the tracking range cannot be temporarily determined (less than a predetermined number of consecutive frames), the system control unit 16 in the information processing device 10 may determine that the target can be tracked.

If other horse is approaching and other jockey is overlapping on the tracked jockey and thus the particles indicate other target, the combinations of helmet color and racing uniform' color are different and thus a hue angle between the parts may change. When the tracked target is out of the frame or the target becomes smaller, or when the target is hidden behind other horse or jockey or building due to occlusion, the particles easy disappear.

When it is determined that the target can be tracked (step S8; YES), the information processing device 10 specifies the target from the positions of the particles (step S9). Specifically, the system control unit 16 in the information processing device 10 specifies the tracked target according to an average value of the position of each particle or specifies a position of the tracked target according to a group of particles. In this way, the system control unit 16 in the information processing device 10 functions as an exemplary target specifying means that specifies a position of a target in an image of a next frame from the positions of the particles set by the particle setting means.

When it is determined that the target cannot be tracked (step S8; NO), the information processing device 10 return to step S3 to reset particles on the target (2a, 2b) in the search regions 25, 26. Specifically, the system control unit 16 in the information processing device 10 reads the position information (such as the coordinate (x1, y1) and the coordinate (x2, y2)) of the set particles p stored in the RAM 16c or the like, and resets the particles p at the same positions in the search regions 25, 26 or at the positions of the initially-set particles in the search regions 25, 26. In addition, the targets such as horse and jockey temporarily hidden due to occlusion easily appear again at the same positions in the search regions on the frame.

In addition, the system control unit 16 in the information processing device 10 may reset the particles p in step S3 at the positions of the temporally-previous set particles in step S6, not at the positions of the initially-set particles. Specifically, the system control unit 16 in the information processing device 10 reads the position information on the set particles p (such as the latest particles before it is determined that the target cannot be tracked) stored in the RAM 16c or the like, and resets the particles p at the same positions in the search regions 25, 26.

In this way, when the track determining means determines that tracking is impossible, the system control unit 16 in the information processing device 10 functions as an exemplary particle resetting means that sets particles in an image of a next frame depending on the positions of the particles set by the particle initial setting means or the particle setting means.

The information processing device 10 then sets search regions from the positions of the particles (step S10). Specifically, the system control unit 16 in the information processing device 10 resets the search regions 25, 26 from average values of the positions of the particles. For example, the system control unit 16 in the information processing device 10 resets such that the average value of the positions of the particles is at the center of the search region 25, 26 to be reset.

As illustrated in FIG. 7, when the target is moving within a frame, the particles also move and correspondingly the search regions 25, 26 are reset. The position of the search region 25 is at a coordinate (X3, Y3) and the position of the search region 26 is at a coordinate (X4, Y4).

The information processing device 10 then determines whether the processing ends (step S11). When the processing does not end (step S11; NO), the processing returns to step S4, where the system control unit 16 in the information processing device 10 acquires an image of a next frame thereby to sequentially acquire frames. When the processing ends (step S11; YES), the system control unit 16 in the information processing device 10 terminates the processing.

As illustrated in FIG. 8, when the helmet part 2a in the search region 25 is zoomed in and enlarged, the outer edge of the tracking range is widened and the number of particles increases. On the other hand, when the helmet part 2a in the search region 25 is zoomed out and downsized for shooting, the outer edge of the tracking range is narrowed and the number of particles decreases.

(2.2 Sub-Routine of Particle Setting)
(2.2.1 Generation of Particles)

Figure 10:
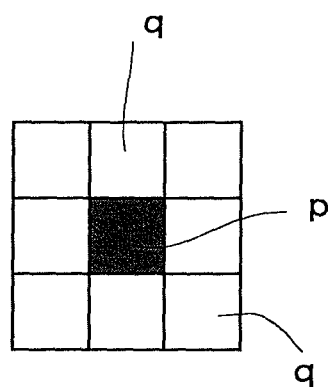
FIG. 10 is a schematic diagram illustrating exemplary neighbors of a particle on a target.
Figure 11:
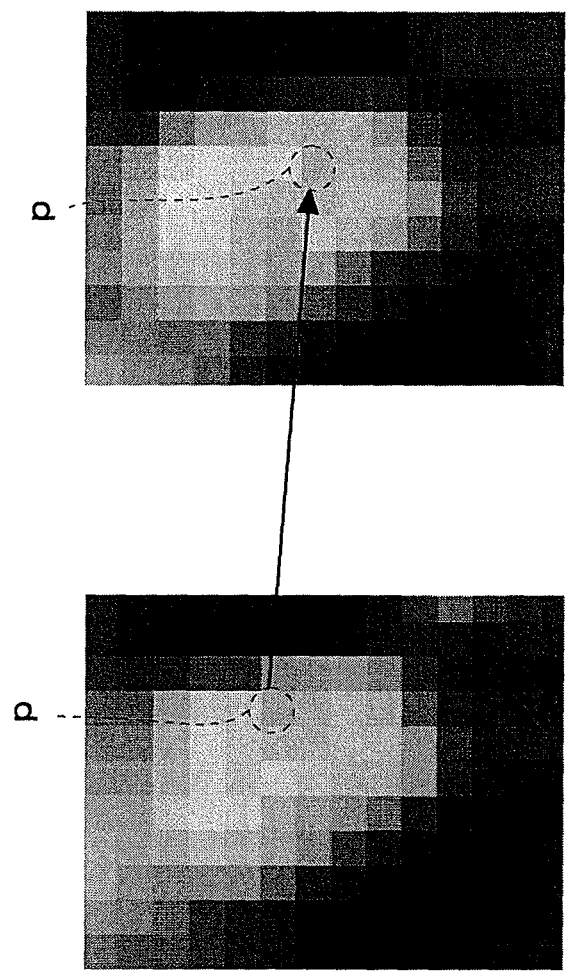
FIG. 11 is a schematic diagram an exemplary similar particle in a next frame.

Generation of particles in the sub-routine of the particle setting will be described below using FIGS. 9 to 11.

Figure 9:
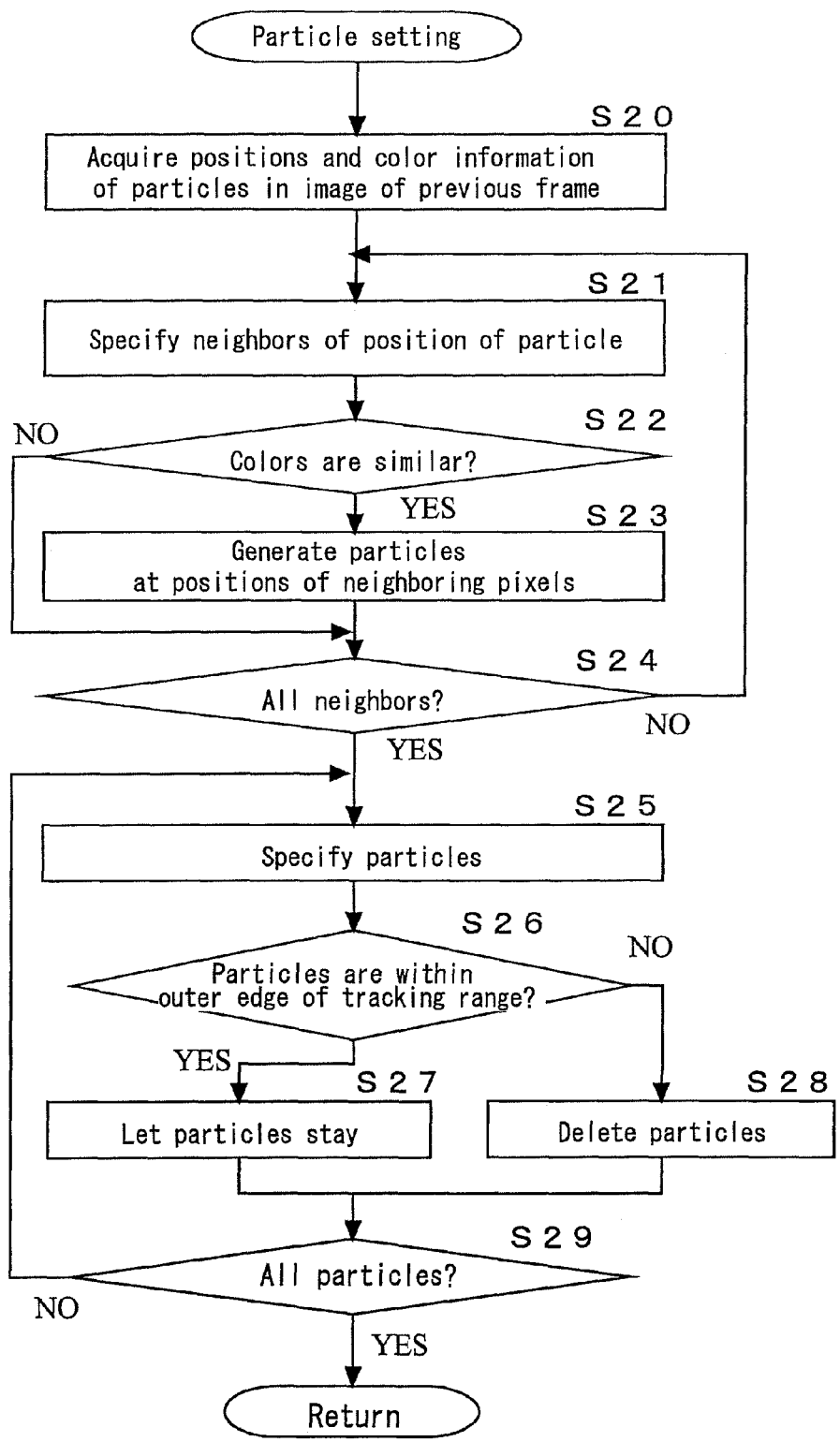
FIG. 9 is a flowchart illustrating a sub-routine of the particle setting of FIG. 2.

FIG. 9 is a flowchart illustrating a sub-routine of particle generation. FIG. 10 is a schematic diagram illustrating exemplary neighbors of a particle on a target. FIG. 11 is a schematic diagram illustrating a similar particle in a next frame.

The information processing device 10 acquires positions and color information of particles in an image of a previous frame (step S20). Specifically, the system control unit 16 in the information processing device 10 acquires the positions (exemplary reference of the positions of the particles in an image of a previous frame) and the color information on the particles in an image of a temporally-previous frame from the RAM 16c or the like.

The information processing device 10 then specifies neighbors of a position of a particle (step S21). Specifically, the system control unit 16 in the information processing device 10 specifies, as one neighbor of the position of the particle, any one pixel out of the particle p at the same position as the position of the particle in the image of the temporally-previous frame (at the position of the reference particle) and eight neighboring pixels q of the particle p in the image of the next frame acquired in step S4 as illustrated in FIG. 10. By way of example, the position of the particle p and the positions of the eight neighboring pixels q are within a predetermined range with reference to the positions of the particles in the previous frame.

The information processing device 10 then determines whether the colors are similar (step S22). Specifically, the system control unit 16 in the information processing device 10 determines whether one specified pixel in step S21 has a similar color to color information (exemplary color information on the pixels at the positions of the reference particles) such as RGB of the particles in the image of the temporally-previous frame.

When the colors are similar (step S22; YES), the information processing device 10 generates particles at the positions of the specified neighboring pixels (step S23).

The information processing device 10 then determines whether all the neighbors are specified (step S24). When all the neighbors are not specified (step S24; NO), the system control unit 16 in the information processing device 10 returns to step S21 to specify an unspecified next pixel from among the center pixel and the eight neighboring pixels.

When a plurality of pixels with similar colors are present, a plurality of particles are correspondingly generated. When a pixel with a similar color is not present, zero particle is generated. As illustrated in FIG. 11, particles are not necessarily generated at the same positions as the positions of the particles in the image of the temporally-previous frame. The positions of the particles may be deviated in the next frame.

(2.2.2 Disappearance of Particles)

Disappearance of particles in the sub-routine of the particle setting will be described below using FIGS. 9, 12 and 13.

Figure 12:
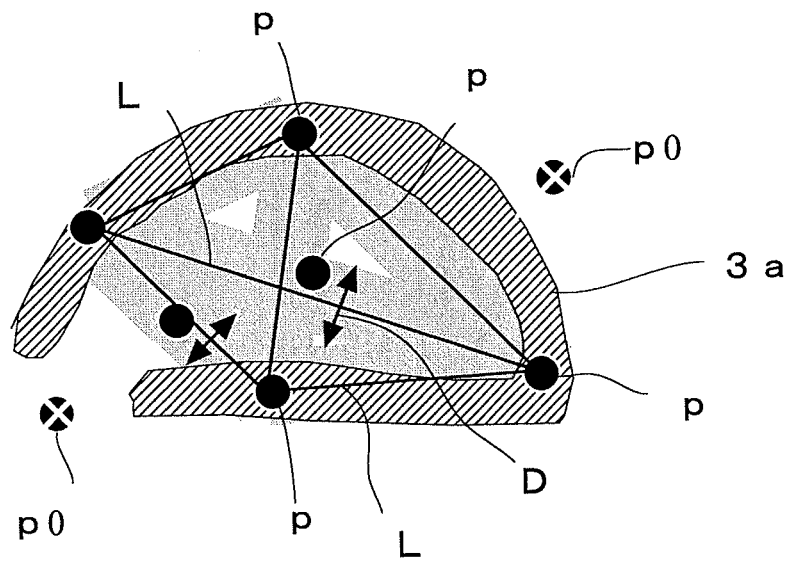
FIG. 12 is a schematic diagram illustrating an exemplary state where particles are present at positions indicating a target.

FIG. 12 is a schematic diagram illustrating an exemplary state where particles are present at positions indicating the target. FIG. 13 is a schematic diagram illustrating a variant of FIG. 12.

As illustrated in FIG. 9, when all the neighbors are specified (step S24; YES), the information processing device 10 specifies a particle (step S25). Specifically, the system control unit 16 in the information processing device 10 specifies one particle from the particles generated in step S20 to step S24.

The information processing device 10 then determines whether the particles are within the outer edge of the tracking range (step S26). Specifically, the system control unit 16 in the information processing device 10 sets a search region 35 having the same position and size as the search region 25 and a search region 36 having the same position and size as the search region 26 in the background subtraction image 30 calculated in step S5 as illustrated in FIG. 5. The system control unit 16 in the information processing device 10 then extracts the background subtraction image 30 in the search regions 35, 36. For example, in the case of the helmet part 2a, an image containing an outer edge 3a (exemplary outer edge of the tracking range) of the helmet part in the background subtraction image in the search region 35 is extracted. The outer edge of the tracking range is the outer edge of the tracking range for tracking particles, and is determined in accordance with the foreground of the background subtraction image. For example, a contour of the tracked target (part of the target may be possible) or a region containing the contour may be employed. That is, the outer edge of the tracking range is a part corresponding to the target in the image of the previous frame, where a degree of difference of the pixel values between the image of the previous frame and the image of the next frame is a threshold or more. In addition, since the images are continuously shot by video, the target slightly moves over the frames used for finding the background subtraction image. Thus, the part corresponding to the target in the foreground in the background subtraction image is the part corresponding to the target in the image in the previous frame.

In this way, the system control unit 16 in the information processing device 10 functions as an exemplary tracking range's outer edge determining means that determines a part corresponding to the target in the image of the previous frame where the degree of difference of the pixel values between the image of the previous frame and the image of the next frame acquired by the frame acquiring means is a threshold or more as an outer edge of the particle tracking range.

The system control unit 16 in the information processing device 10 then determines that the particles p on the image of the outer edge 3a of the helmet part indicating the contour of the helmet part 2a are within the outer edge of the tracking range as illustrated in FIG. 12, for example. The system control unit 16 in the information processing device 10 sets straight lines L connecting the particles p on the image of the outer edge 3a of the helmet part, gives a predetermined width D to the straight lines L, and if a particle is present within the width, determines that the particle is within the outer edge of the tracking range.

Figure 13:
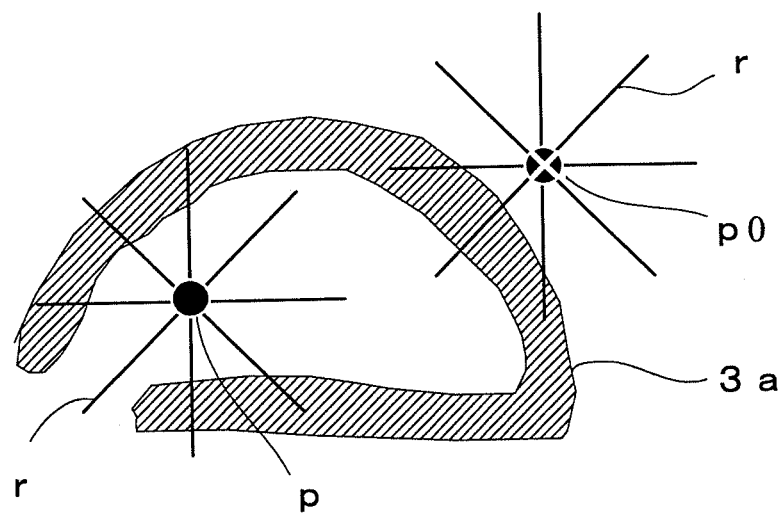
FIG. 13 is a schematic diagram illustrating a variant of FIG. 12.

As illustrated in FIG. 13, the system control unit 16 in the information processing device 10 sets straight lines r with a predetermined length at equal angles in eight directions about the particle, for example. When the number of straight lines r with a definite length overlapping on the pixels indicating the outer edge 3a of the helmet part is a predetermined number (such as four) or more, the system control unit 16 in the information processing device 10 may determine that the particles are within the outer edge of the tracking range.

As illustrated in FIG. 12 and FIG. 13, even when the image of the outer edge 3a of the helmet part indicating the contour of the helmet part 2a is not closed, a determination can be made as to whether the particle is within the outer edge of the tracking range. The helmet or the like easily moves up and down in the video and the contour appears at the upper and lower sides of the background subtraction image, but it does not move rightward and leftward so much and the contour does not easily appear at the right and left sides. Part of the contour of the helmet or the like may not easily appear due to an association between the helmet or the like and the background. Thus, the contour or the like of the helmet part 2a may not be completely closed.

In this way, the system control unit 16 in the information processing device 10 functions as an exemplary track determining means that determines whether the target can be tracked based on the particles set by the particle setting means.

When the particles are within the outer edge of the tracking range (step S26; YES), the information processing device 10 lets the specified particles stay as particles (step S27). Specifically, the system control unit 16 in the information processing device 10 leaves the particles p on the image of the outer edge 3a of the helmet part or the particles p present within the predetermined width D of the straight lines L as illustrated in FIG. 12. As illustrated in FIG. 13, there are left particles p through which five straight lines overlap on the pixels indicating the outer edge 3a of the helmet part.

On the other hand, when the particles are not within the outer edge of the tracking range (step S26; NO), the information processing device 10 deletes the particles (step S28). Specifically, since the particle p0 is not present within the predetermined width D of the straight lines L, not on the image of the outer edge 3a of the helmet part as illustrated in FIG. 12, the system control unit 16 in the information processing device 10 deletes and eliminates the particle p0. As illustrated in FIG. 13, three straight lines overlap on the pixels indicating the outer edge 3a of the helmet part at the particle p0, and thus the information processing device 10 deletes the particle p0. The system control unit 16 in the information processing device 10 deletes the specified particle from the RAM 16c or the like where the position information or color information on the particles p is stored.

In addition, when the outer edge of the tracking range is not determined such that the target is temporarily hidden due to occlusion, and thus a determination cannot be made as to whether the particles are within the outer edge of the tracking range in step S26, the system control unit 16 in the information processing device 10 may perform a processing of letting all the particles stay as in step S27.

The information processing device 10 then determines whether all the particles are specified (step S29). When all the particles are not specified (step S29; NO), the processing returns to step S25, where the system control unit 16 in the information processing device 10 specifies a next particle. When all the particles are specified (step S29; YES), the sub-routine ends, and the information processing device 10 performs the processing in step S7.

In this way, particles are generated and narrowed to the particles within the outer edge of the tracking range determined in accordance with the background subtraction image thereby to set particles in the next frame at the positions of the pixels which are within a predetermined range with reference to the positions of the particles in the previous frame and within the outer edge determined by the tracking range's outer edge determining means and which have similar color information to the color information of the pixels at the position of the reference particle.

Next, an exemplary transition of the number of particles when the method according to the present embodiment that narrows particles within the outer edge of the tracking range determined depending on the background subtraction image (which will be denoted as "method according to the present embodiment" below) is used and when it is not used will be described below using FIG. 14 by way of example.

Figure 14:
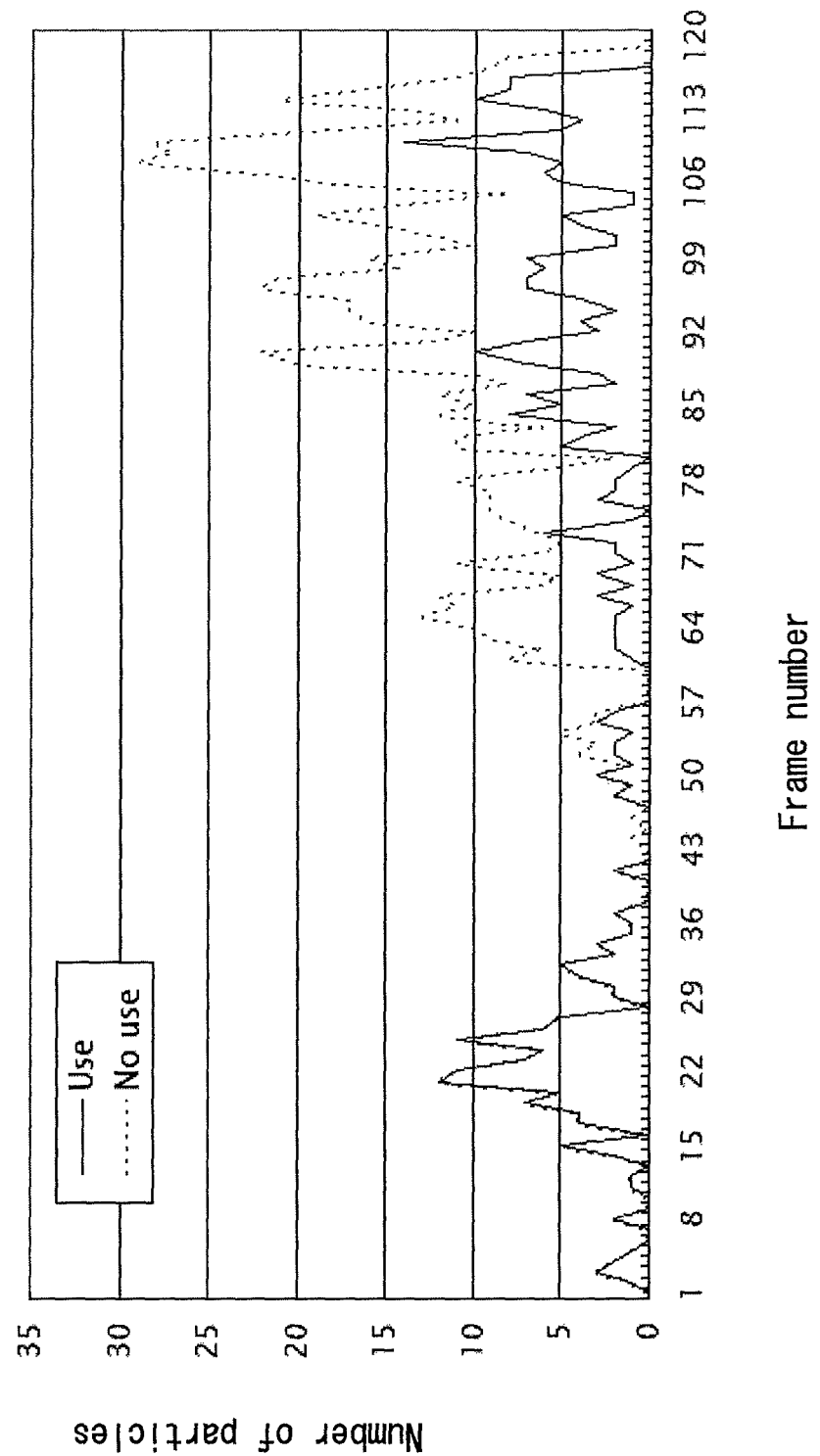
FIG. 14 is a diagram illustrating an exemplary transition of the number of particles when a method according to the present embodiment is used and when it is not used.

FIG. 14 is a diagram illustrating an exemplary transition of the number of particles when the method according to the present embodiment is used and when it is not used. In addition, the number of particles indicates the number of particles in the entire frame.

As illustrated in FIG. 14, when a frame number exceeds about 60, the number of particles tends to increase when the method according to the present embodiment is not used (in a broken line in the figure). On the other hand, when the method according to the present embodiment is used (in a solid line in the figure), the outer edge of the particle tracking range is set according to the background subtraction image and thus the number of particles is stable. Particles are generated only at the positions of neighboring pixels having similar color information, and thus the number of particles is stable. In this way, the number of particles is stable and the number of particles does not explosively increase, thereby preventing the amount of calculation from remarkably increasing.

As described above, according to the present embodiment, at least one particle p is set on the target 2 (the helmet part 2a and the racing uniform part 2b) in the image of the previously-selected frame 20 of the video, temporally-previous frames and temporally-next frames in the video are sequentially acquired after the previously-selected frame, a part corresponding to the target in the image of the previous frame, where a degree of difference of the pixel values between the image of the temporally-previous frame and the image of the temporally-next frame is a threshold or more, is determined as the outer edge 3a of the particle tracking range, particles in the image of the next frame are set at the positions of the pixels which are within a predetermined range with reference to the positions of the particles in the image of the previous frame or within the outer edge of the tracking range and which have color information similar to the color information of the pixels at the positions of the reference particles, and a position of the target in the image of the next frame is specified from the positions of the set particles. Thus, the particles p in the image of the next frame are set only within the outer edge 3a of the tracking range in accordance with the background subtraction image, thereby restricting the set particles from spreading and preventing the particles p from scattering, so that the target can be accurately tracked. Since the particles are limited within the outer edge 3a of the tracking range, the number of particles is prevented from explosively increasing, thereby restricting the amount of calculation from increasing due to an increase in particles.

Since particles are generated and limited within the outer edge 3a of the tracking range in accordance with the background subtraction image, even when the size of the target in the frame changes due to zoom-in or zoom-out, the target can be tracked.

When the image depending on background subtraction as the foreground is calculated when the degree of difference of the pixel values is a threshold or more, and the outer edge of the particle tracking range is determined according to the foreground corresponding to the target, the particles are properly limited within the outer edge 3a of the tracking range in accordance with the image depending on background subtraction, thereby preventing the particles p from scattering, so that the target can be accurately tracked.

When particles are initially set at a plurality of parts in the target, hues of the pixels where the particles at the parts in the target are positioned are calculated, hue angles between the parts are calculated, and the position of the target is specified further based on the calculated hue angles between the parts, a relationship between a plurality of parts in the target 2 (the helmet part 2a and the racing uniform part 2b) can be tracked by specifying the target 2 from the hue angles between the parts, thereby preventing erroneous tracking and enhancing an accuracy of tracking the target. For example, when the hue angle between the parts is different by more than a predetermined amount, a different target is likely to be tracked, and in this case, the system control unit 16 in the information processing device 10 determines that tracking is impossible, thereby preventing erroneous tracking. Even similar colors of the helmets can be eliminated depending on a combination with a racing uniform, thereby accurately specifying the target. When the amount of change in brightness is ignored, the amount of calculation can be reduced by use of the information on the hues. In addition, even when the brightness changes due to weather, the hue value seldom changes, and thus an accuracy of tracking the target is further enhanced.

When a determination is made as to whether the target can be tracked based on the set particles, and tracking is determined to be impossible, even when the target is temporarily hidden behind an obstacle or the like or the target arrives at the end of the frame to be temporarily outside the frame when the particles are reset in the image of the next frame according to the positions of the set particles, the target can be continuously tracked, and an accuracy of tracking the target is further enhanced. In this way, even when the number of particles reaches zero due to an occurrence of occlusion or coming-off of the target from the frame, particles are rest at the initial positions of the set particles in the search regions 25, 26 or at the positions of the particles before the target cannot be tracked, thereby tracking the target. The initial positions of the initially-set particles are stored irrespective of the background subtraction processing, so that tracking is enabled again by use of the initial positions of the particles even when occlusion or the like occurs.

(2.3 Variant of Sub-Routine of Particle Setting)

A variant of the sub-routine of the particle setting will be described below using FIG. 15.

Figure 15:
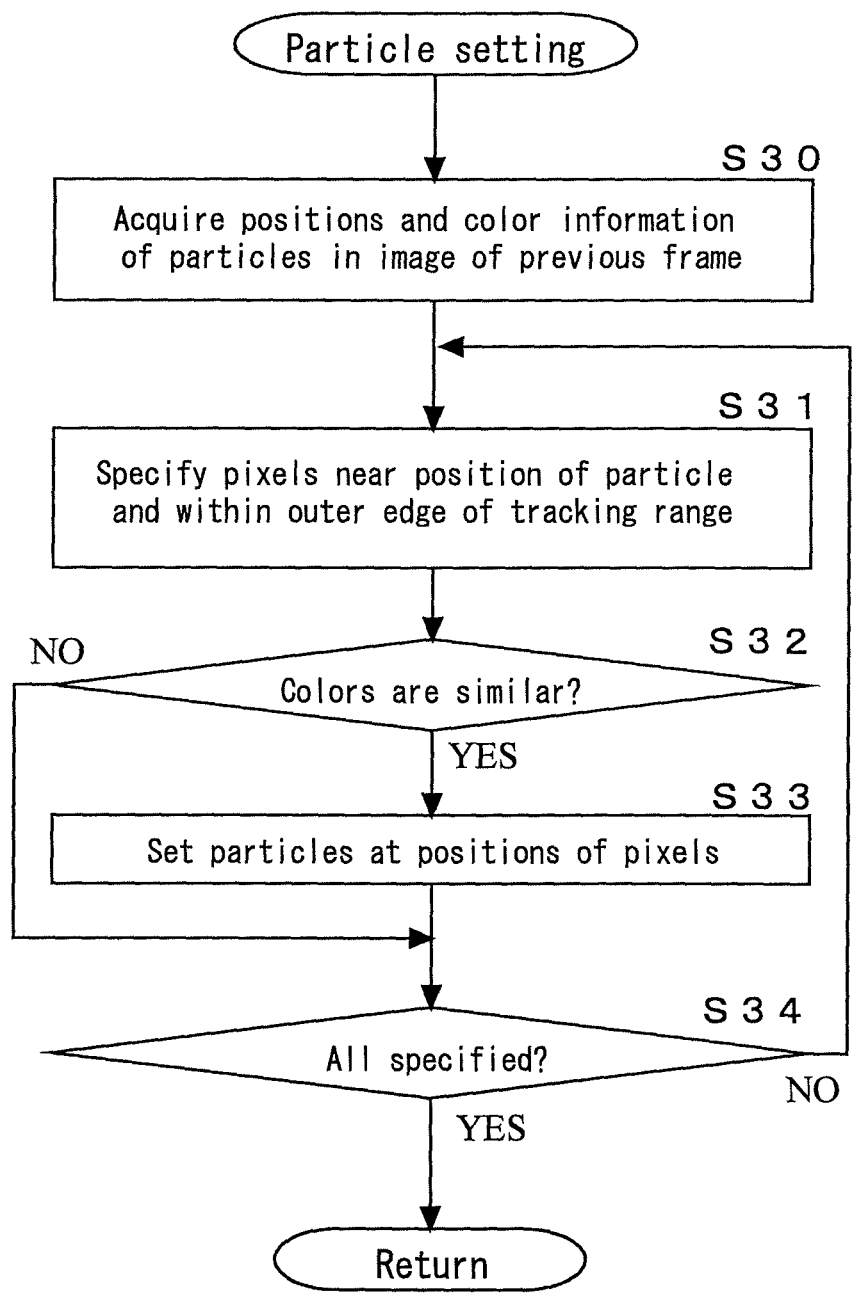
FIG. 15 is a flowchart illustrating a variant of the sub-routine of the particle setting of FIG. 9.

FIG. 15 is a flowchart illustrating a variant of the sub-routine of the particle setting.

As illustrated in FIG. 15, the information processing device 10 acquires the positions and color information of particles in an image of a previous frame as in step S20 (step S30).

The information processing device 10 then specifies pixels near a position of a particle and within the outer edge of the tracking range (step S31). Specifically, the system control unit 16 in the information processing device 10 specifies the pixels contained in the neighbors of the particle as illustrated in FIG. 10 and within the outer edge of the tracking range as illustrated in FIG. 12 or FIG. 13, as an example of a predetermined range with reference to the position of the particle in the previous frame.

The information processing device 10 then determines whether the colors of the specified pixels are similar to each other as in step S22 (step S32).

When the colors of the specified pixels are similar to each other (step S32; YES), the information processing device 10 sets particles at the position of the pixels (step S33).

The information processing device 10 then determines whether all the pixels meeting a predetermined condition are specified (step S34). Specifically, the system control unit 16 in the information processing device 10 determines whether all the pixels contained in a predetermined range with reference to the position of the particle in the previous frame and meeting the condition within the outer edge of the tracking range are specified. When all the pixels are not specified (step S34; NO), the information processing device 10 specifies a next pixel. When all the pixels are specified (step S34; YES), the sub-routine ends and the information processing device 10 performs the processing in step S7. In addition, if pixels having similar color information are not present within the predetermined range with reference to the position of the particle in the previous frame and within the outer edge of the tracking range, a particle is not set.

In this way, in the present variant, the information processing device 10 sets particles only at the positions in accordance with the background subtraction image without losing particles.

In addition, in step S2 and step S3, the search regions 25, 26 and particles p may be set automatically or manually by the user. In the case of automatic setting, the information processing device 10 searches a frame of the target matching with the information such as the information on the color of the helmet and the color of the racing uniform of each jockey and the information on a positional relationship between the helmet and the racing uniform, and automatically sets the search regions 25, 26 to contain part of the target. Then, the information processing device 10 searches a part with a closest color to the color of the helmet or the racing uniform near the border of part of the target or in the region surrounded by the border for part of the target in the set search regions 25, 26, and automatically sets particles p.

When the target is temporarily hidden due to occlusion or the foreground of the background subtraction image is temporarily unclear due to a slight motion or looking of the target so that the outer edge of the tracking range cannot be temporarily determined in the particle setting in step S6 (less than a predetermined number of consecutive particles), the system control unit 16 in the information processing device 10 may set particles in the image of the next frame in accordance with the positions of the particles in the previous frame where the outer edge of the tracking range cannot be determined, with reference to the RAM 16c. In this case, the target is temporarily hidden due to occlusion, and thus, even when the outer edge of the tracking range cannot be found, the target can be accurately tracked.

For example, there is assumed that for the frame t−1 to the frame t+2, the outer edge of the tracking range can be specified from the background subtraction image ((frame t)−(frame t−1)) at the frame t and the outer edge of the tracking range cannot be specified from the background subtraction image ((frame t+1)−(frame t)) at the frame t+1 but the outer edge can be specified from the background subtraction image ((frame t+2)−(frame t+1)) at the frame t+2. At this time, the system control unit 16 in the information processing device 10 reads the position information on the set particles p at the frame t with reference to the RAM 16c or the like at the frame t and resets the particles p at the frame t+1 or the frame t+2 at the same positions in the search regions 25, 26.

In step S7, RGB distances between the particles in the helmet part 2a and the particles in the racing uniform part 2b may be calculated in the RGB space instead of calculating hue angles. When the RGB distance between the parts changes beyond a predetermined threshold, the information processing device 10 determines that tracking is impossible in step S8.

A plurality of parts in the target may be a part of the horse and a part of the jockey instead of the helmet part 2a and the racing uniform parts 2b. The target may be a combination of integrally moving horse and jockey, only a jockey or only a horse.

A plurality of targets to be tracked may be present within a frame.

Further, the present invention is by no means limited to the above embodiment. The above embodiment is an illustration, and all are included in a technical range of the present invention as long as these employ a substantially same configuration as a technical idea recited in the claims of the present invention and provide the same function and effect.

EXPLANATION OF REFERENCE NUMERALS

2: Target
2a: Helmet part
2b: Racing uniform part
3a: Helmet part of background subtraction image (outer edge of tracking range)
10: Information processing device
12: Storage unit (storing means)
16: System control unit
16c: RAM (storing means)
20: Frame
25, 26: Search region
30: Background subtraction image
p: Particle

The invention claimed is:

1. An information processing device that tracks a predetermined target in a video made of a plurality of frames, comprising:

a particle initial setting unit that sets at least one particle on the target in an image of a previously-selected frame in the video;
a frame acquiring unit that sequentially acquires temporally-previous frames and temporally-next frames in the video after the previously-selected frame;
a tracking range's outer edge determining unit that determines, as an outer edge of a particle tracking range, a part corresponding to the target in an image of a previous frame among the temporally-previous frames where a degree of difference in pixel values between the image of the previous frame and an image of a next frame among the temporally-next frames acquired by the frame acquiring unit is a threshold or more;
a particle setting unit that sets particles in the image of the next frame at positions of pixels which are within a predetermined range with reference to positions of particles in the image of the previous frame and within an outer edge determined by the tracking range's outer edge determining unit and which have color information similar to color information on pixels at the positions of the particles; and
a target specifying unit that specifies a position of the target in the image of the next frame from the positions of the particles set by the particle setting unit.

2. The information processing device according to claim 1, wherein the particle initial setting unit sets the particles at a plurality of parts of the target, a hue angle calculating unit that calculates a hue of a pixel where the particle at each part of the target is positioned and calculates a hue angle between the parts is further provided, and the target specifying unit specifies a position of the target further based on the hue angle between the parts calculated by the hue angle calculating unit.

3. The information processing device according to claim 1, further comprising:

a track determining unit that determines whether the target can be tracked based on the particles set by the particle setting unit; and
a particle resetting unit that, when the track determining unit determines that tracking is impossible, resets particles in the image of the next frame according to the positions of the particles set by the particle initial setting unit or the particle setting unit.

4. The information processing device according to claim 1, further comprising:

a storing unit that stores the positions of the particles set by the particle initial setting unit or the particle setting unit, wherein when the tracking range's outer edge determining unit cannot determine an outer edge of the tracking range, the particle setting unit sets particles in the image of the next frame according to the positions of the particles in the previous frame for which the outer edge of the tracking range cannot be determined with reference to the storing unit.

5. An information processing method for tracking a predetermined target in a video made of a plurality of frames, comprising:

a particle initial setting step of setting at least one particle on the target in an image of a previously-selected frame in the video;
a frame acquiring step of sequentially acquiring temporally-previous frames and temporally-next frames in the video after the previously-selected frame;
a tracking range's outer edge determining step of determining, as an outer edge of a particle tracking range, a part corresponding to the target in an image of a previous frame among the temporally-previous frames where a degree of difference in pixel values between the image of the previous frame and an image of a next frame among the temporally-next frames acquired by the frame acquiring unit is a threshold or more;

a particle setting step of setting particles in the image of the next frame at positions of pixels which are within a predetermined range with reference to positions of particles in the image of the previous frame and within an outer edge determined by the tracking range's outer edge determining unit and which have color information similar to color information on pixels at the positions of the particles; and a target specifying step of specifying a position of the target in the image of the next frame from the positions of the particles set by the particle setting unit.

6. A non-transitory computer readable recording medium that stores therein a program for an information processing device that tracks a predetermined target in a video made of a plurality of frames, the program causing a computer to function as:

a particle initial setting unit that sets at least one particle on the target in an image of a previously-selected frame in the video;

a frame acquiring unit that sequentially acquires temporally-previous frames and temporally-next frames in the video after the previously-selected frame;

a tracking range's outer edge determining unit that determines, as an outer edge of a particle tracking range, a part corresponding to the target in an image of a previous frame among the temporally-previous frames where a degree of difference in pixel values between the image of the previous frame and an image of a next frame among temporally-next frames acquired by the frame acquiring unit is a threshold or more;

a particle setting unit that sets particles in the image of the next frame at positions of pixels which are within a predetermined range with reference to positions of particles in the image of the previous frame and within an outer edge determined by the tracking range's outer edge determining unit and which have color information similar to color information on pixels at the positions of the particles; and a target specifying unit that specifies a position of the target in the image of the next frame from the positions of the particles set by the particle setting unit.

* * * * *